United States Patent [19]
Hansen et al.

[11] Patent Number: 5,566,065
[45] Date of Patent: Oct. 15, 1996

[54] METHOD AND APPARATUS FOR CONTROLLING MULTIVARIABLE NONLINEAR PROCESSES

[75] Inventors: Peter D. Hansen, Wellesley Hills; Paul C. Badavas, Southboro, both of Mass.

[73] Assignee: The Foxboro Company, Foxboro, Mass.

[21] Appl. No.: 333,539

[22] Filed: Nov. 1, 1994

[51] Int. Cl.⁶ .................................................. G05B 13/02
[52] U.S. Cl. ........................ 364/164; 364/148; 364/153; 395/906
[58] Field of Search ..................................... 364/148, 137, 364/149–154, 160–165; 395/903, 904, 906, 21, 22

[56] References Cited

U.S. PATENT DOCUMENTS

| | | | |
|---|---|---|---|
| 5,111,531 | 5/1992 | Grayson et al. | 364/162 |
| 5,119,468 | 6/1992 | Owens | 364/151 |
| 5,121,467 | 6/1992 | Skeirik | 395/906 |
| 5,175,678 | 12/1992 | Frericks et al. | 364/148 |
| 5,197,114 | 3/1993 | Skeirik | 395/906 |
| 5,282,261 | 1/1994 | Skeirik | 395/906 |
| 5,347,446 | 9/1994 | Iino et al. | 364/164 |
| 5,351,184 | 9/1994 | Lu et al. | 364/165 |
| 5,394,322 | 2/1995 | Hansen | 364/162 |
| 5,396,416 | 3/1995 | Berkowitz et al. | 364/165 |

FOREIGN PATENT DOCUMENTS

| | | |
|---|---|---|
| 9312476 | 6/1993 | WIPO. |
| 9315448 | 8/1993 | WIPO. |

OTHER PUBLICATIONS

Application of Artificial Neural Networks for Nonlinear Model of Predictive Control, Hong–Te Su, N. DiMascolo, T. McAvoy, Apr. 1993, University of Maryland.

*Primary Examiner*—Tan V. Mai
*Assistant Examiner*—Steven R. Garland
*Attorney, Agent, or Firm*—Jules Jay Morris; Terrence Martin; David Barron

[57] ABSTRACT

A method and apparatus for a robust process control system which utilizes a neural-network based multivariable inner-loop PD controller cascaded with decoupled outer-loop controllers with integral action, the combination providing a multivariable nonlinear PID and feedforward controller. The inner-loop PD controller employs a quasi-Newton iterative feedback loop structure whereby the manipulated variables are computed in an iterative fashion as a function of the difference between the inner loop setpoint and the predicted controlled variable as advanced by the optimum prediction time, in order to incorporate the downstream limiting effects on the non-limited control loops. The outer-loop controllers compensate for unmodeled process changes, unmeasured disturbances, and modeling errors by adjusting the inner-loop target values.

31 Claims, 10 Drawing Sheets

METHOD AND APPARATUS FOR CONTROLLING MULTIVARIABLE NONLINEAR PROCESSES

BACKGROUND

1. Technical Field

This invention relates to industrial process controls, more particularly, for a method and apparatus for controlling multivariable, dynamic, nonlinear industrial processes.

2. Background Art

Industrial automation has continually strived towards attaining the optimum manner for controlling industrial processes in order to meet quality and production requirements. However, most modern industrial processes are complex requiring multiple control variables with interacting dynamics having time delays and lags, and nonlinearities. To handle such complex industrial processes, there have evolved various process control techniques.

Most current process control techniques determine the optimum operation of a process by monitoring one or more of the process's characteristics over time in order to adjust the operational parameters of the process. In order to compute the optimum operational parameters, especially in light of variations in the setpoint, system dynamics, and disturbances, these techniques may rely on a model of the plant process to predict the future behavior of the system. In some advanced techniques, this model, or part of it, is incorporated within a controller structure. The accuracy of these techniques relies on a precise dynamic model of the process. Such a model may not be available since some processes have uncertainties which cannot be modeled precisely or simply.

Recently, neural networks have become an attractive means for modeling complex processes. This is because a neural network has the inherent ability to approximate a multivariable nonlinear function. The neural network is also advantageous since it does not require a complete or precise understanding of the process. Rather, it can acquire a representation of the process through its capacity to be trained and to learn by example. A neural network has the additional capability of handling delayed variables and, hence, represent dynamic systems.

The application of neural networks in the process control area is a relatively recent development. Nevertheless, various neural-network control systems have been developed. One such type is a control system which uses neural networks in the well established nonlinear model predictive control framework. Typically, these types of control systems use a controller, employing a neural network model of the process, to determine the manipulated variable which will put the process at the target value. Process feedback is provided through a process-model-mismatch signal which is applied to the setpoint thereby compensating for unmodeled disturbances. This mismatch signal is the difference between the process output and a modelled process output generated by a neural network model of the process.

The controller consists of a neural network model and an optimizer. The neural network model is used to predict the effect of possible manipulated variable trajectory on the process outputs over a future time trajectory taking into account present and recent past process input and output values. The optimizer uses this information to select values of the manipulated variables such that the process outputs optimally track the setpoint and satisfy a given set of constraints.

The primary limitation of this type of process control system is that it does not handle effectively unmeasured load disturbances for a lag dominant process. Although the use of a model error feedback gives the system the capability to handle well a pure dead-time dominant process, the method does not stabilize a non-self regulating or an open-loop-unstable process unless some additional feedback is applied. There is no proportional or derivative feedback, only a quasi-integral feedback action provided through the process-model-mismatch signal.

It is an object of this invention to provide a robust and efficient process control system which accounts for the above mentioned limitations. More particularly, an optimal multivariable nonlinear control system which is robust, accommodates non-self regulating processes as well as pure dead time processes, compensates to prevent upsets by measured loads, and combats unmeasured disturbances with high feedback gain.

Other general and specific objects of this invention will be apparent and evident from the accompanying drawings and the following description.

SUMMARY OF THE INVENTION

A method and apparatus for a robust process control system that utilizes a neural-network-based controller providing improved control of multivariable, nonlinear, dynamic processes is herein disclosed.

The process control system utilizes a neural-network-based controller as an inner-loop multivariable proportional-and-derivative (PD) controller cascaded with decoupled outer-loop controllers which provide integral action, the combination providing a multivariable nonlinear proportional-and-integral-and-derivative (PID) and feedforward controller. The inner-loop neural-network PD controller is trained to achieve optimal performance when future process behavior repeats the training experience. The outer-loop controllers compensate for unmodeled process changes, unmeasured disturbances, and modeling errors by adjusting the inner-loop target values.

The inner-loop PD controller employs a quasi-Newton iterative feedback loop structure whereby the manipulated variables are computed in an iterative fashion as a function of the difference between the inner loop setpoint and the predicted controlled variable as advanced by the optimum prediction time, in order to incorporate the downstream limiting effects on the non-limited control loops. This control system incurs an overhead for the on-line iterative calculation yet provides more accurate control of the non-limited control loops when limiting occurs.

There are four embodiments of this process control system. In the first and second embodiments, the process control system utilizes the combined multivariable nonlinear proportional-and-integral-and-derivative and feedforward controller. The inner-loop PD controller produces the change in the manipulated variable needed to place the process at the desired setpoint level based on measurements of the process and their derivatives. The inner-loop PD controller also produces the optimum prediction time of the process which is used by the outer-loop integral controllers in performing integral action. In the first control embodiment, the inner-loop PD controller and the outer-loop controllers simultaneously receive feedback from the process through controlled variables sampled at a specified measurement rate. In the second control embodiment, the inner-loop controller receives process feedback through inferential variables sampled at a faster measurement rate thereby providing a quick response to changes in the process. The integral controllers receive feedback through the controlled variables thereby providing integral action to adjust the setpoint to compensate for unmodeled errors, unmeasured disturbances, and the like.

In the third and fourth embodiments, the control system consists of the PD feedforward controller solely without the outer-loop integral controllers. In the third embodiment, the controller receives process feedback through the controlled variables thereby responding to changes in the process at the measurement rate. In the fourth embodiment, the controller receives feedback through inferential variables thereby producing a faster control response to changes in the process.

BRIEF DESCRIPTION OF THE DRAWINGS

The foregoing and other objects, features and advantages of the invention will be apparent from the following more particular description of the preferred embodiments of the invention, as illustrated in the accompanying drawings in which like reference characters refer to the same elements throughout the different views. The drawings are schematic representations of control elements, emphasis being placed on illustrating the principles of the invention.

DESCRIPTION OF THE ILLUSTRATED EMBODIMENT

Figure 1:
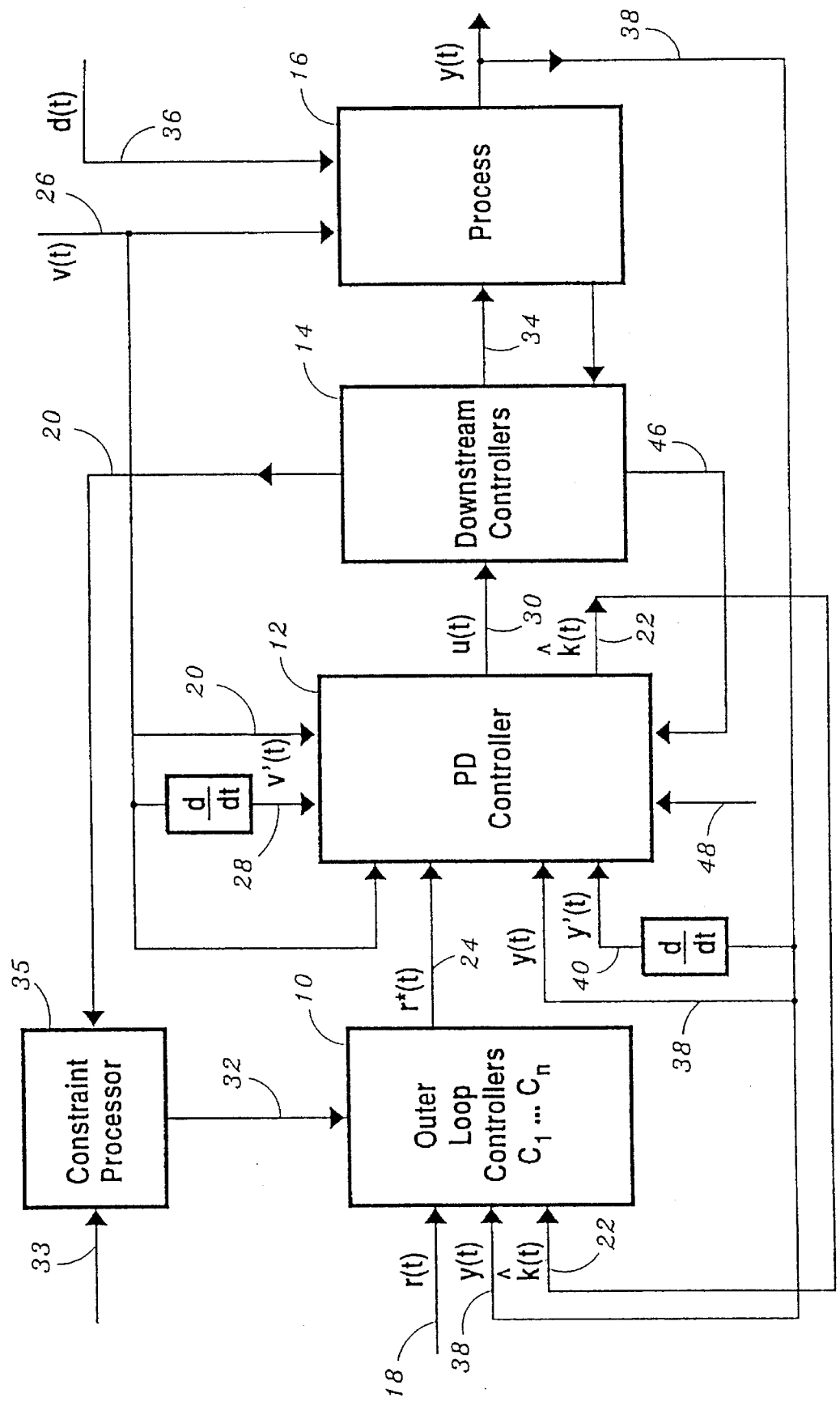
FIG. 1 illustrates the first embodiment of the process control system wherein the inner-loop PD controller is cascaded with outer-loop controllers which both receive process feedback through the controlled variables.

A method and apparatus for a robust process control system that utilizes a neural-network controller providing improved control of multivariable, nonlinear, dynamic processes is herein disclosed.

Prior to describing the details of the invention, a brief synopsis of the signals used in the invention is presented first.

t is an integer representing a particular time step of the process.

r(t) outer-loop setpoint—the input signal which represents the target value of the process output at time step t.

r*(t) inner-loop setpoint—the input signal which has been adjusted by the outer-loop controller to compensate for unaccounted process dynamics, disturbances, and modeling errors.

u(t) manipulated variable—a vector of signals which represents a quantity or condition which is varied at time step t as to change the value of the controlled variable.

y(t) controlled variable—a vector of process output signals which represents the measured process output at time step t. For the purposes of this application, the terms controlled variable and measured process output are used synonymously.

y'(t) derivative of the controlled variable—a vector of signals which represents the rate of change with respect to time of the measured process output at time step t.

w(t) inferential variable—a vector of process output signals which represents inferential values of the measured process output at time step t.

w'(t) derivative of the inferential variable—a vector of signals which represents the rate of change with respect to time of the inferential process output at time step t.

v(t) measured load variable—a vector of signals representing a known disturbance of a measured quantity occurring at time step t.

v'(t) derivative of the measured load variable—a vector of signals which represents the rate of change with respect to time of the measured load signal at time step t.

$\hat{k}(t)$ optimum prediction time—a vector of real numbers representing the relative time where the corresponding controlled variable is most sensitive to a change in its paired manipulated variable. For the purposes of this application, the terms delay time, dead time, and optimum prediction time are used synonymously.

$\hat{y}(t+\hat{k}(t))$ predicted controlled variable as advanced by the optimum prediction time—a vector of model output signals which predicts the measured process output or controlled variable at time step t advanced by the optimum prediction time, $\hat{k}(t)$, in terms of inputs and input derivatives at time step t. For the purposes of this application, the terms predicted controlled variable and predicted controlled variable as advanced by the optimum prediction time are used interchangeably.

d(t) unmeasured load disturbance—a vector of signals representing the disturbance caused by noise or load changes which is of an unmeasured quantity occurring at time step t.

For the purposes of this application, when the above notations are used in the text and diagrams, they denote a vector of signals. For example, u(t) represents a vector of manipulated variable signals, $u_1(t) \ldots u_n(t)$.

This disclosure presents a process control system encompassing a neural-network-based controller. The neural network can be trained off-line and in the manner as described in the third and fourth embodiments of copending application entitled "A Method and Apparatus for Providing Multivariable Nonlinear Control Application No. 08/333,095," and filed the same date herewith, whose disclosure is herein incorporated by reference.

The process control system utilizes a neural-network-based controller as an inner-loop multivariable proportional-and-derivative (PD) controller cascaded with decoupled outer-loop controllers which provide integral action, the combination providing a multivariable nonlinear proportional-and-integral-and-derivative (PID) and feedforward controller. The inner-loop neural-network PD controller is trained to achieve optimal performance when future process behavior repeats the training experience. The outer-loop controllers compensate for unmodeled process changes, unmeasured disturbances, and modeling errors by adjusting the inner-loop target values.

The inner-loop PD controller employs a quasi-Newton iterative feedback loop structure whereby the manipulated variables are computed in an iterative fashion as a function of the difference between the inner loop setpoint and the optimum predicted controlled variable, in order to incorporate the downstream limiting effects on the non-limited control loops. The PD controller utilizes a neural network trained to output a predicted controlled variable and an optimum prediction time. The predicted controlled variable and the optimum prediction time are then used to determine the corresponding manipulated variable which will affect the process in the preferred manner. The optimum prediction time becomes the effective response time of the predicted controlled variable to the setpoint where the greatest change in the predicted controlled variable occurs as a result of a small change made to its paired manipulated variable. The optimum prediction time represents the situation where the least manipulated variable change is required to place the future controlled variable at its target value or setpoint. If another time were used, the manipulated variable change would be larger resulting in an over correction and therefore oscillatory and possibly unstable behavior.

The predicted controlled variable, $\hat{y}(t+\hat{k}(t))$, represents the measured process output as advanced by the optimum prediction time, $t+\hat{k}$. It is then used to compute the corresponding paired manipulated variable which will affect the process causing it to approach the desired setpoint. The computation of the manipulated variable is performed by an iterative high-gain feedback loop considering the effect of any limited manipulated variables on the non-limited manipulated variables.

In the first and second embodiments, the process control system utilizes the combined multivariable nonlinear proportional-and-integral-and-derivative and feedforward controller. The inner-loop PD controller produces the change in the manipulated variable needed to place the process at the desired setpoint level based on measurements of the process and their derivatives. The inner-loop PD controller also produces the optimum prediction time of the process which is used by the outer-loop integral controllers in performing integral action. In the first control embodiment, the inner-loop PD controller and the outer-loop controllers simultaneously receive feedback from the process through controlled variables sampled at a specified measurement rate. In the second control embodiment, the inner-loop controller receives faster process feedback through inferential variables made at a faster measurement rate thereby providing a quick response to process changes. The integral controllers receive feedback through the controlled variables thereby providing integral action to adjust the setpoint to compensate for unmodeled errors, unmeasured disturbances, and the like. Integral windup is prevented through a constraint management scheme which stops the integrating action of the controller when limiting is detected in its downstream path.

In the third and fourth embodiments, the control system consists of the PD controller solely without the outer-loop integral controllers. In the third embodiment, the controller receives process feedback through the controlled variables thereby responding to changes in the process at the measurement rate. In the fourth embodiment, the controller receives feedback through inferential variables thereby producing a faster control response to changes in the process.

FIG. 1 depicts the structure of the first process control embodiment. Referring to FIG. 1, the process control structure can be a PID controller consisting of outer-loop integral-type controllers, 10, cascaded with a PD controller, 12, cascaded with further controllers 14, downstream from the PID controller, which are coupled to a process 16. The downstream controllers 14 may include conventional control elements such as valves, actuators, and the like. The outer-loop controllers, 10, receive the outer-loop setpoints, $r(t)$, 18, the controlled variables fed back from the process, $y(t)$, 38, and the optimum prediction times, $\hat{k}(t)$, 22, produced from PD controller 12. The outer-loop controllers adjust the outer-loop setpoints producing inner-loop setpoints $r^*(t)$, 24. Controllers 10 can be programmable general purpose CPUs or dedicated controllers such as The Foxboro Company's 760 Series Controllers. PD controller 12 can be implemented in software, to be run on a CPU, in hardware through electronic circuitry, or as a hybrid system, partially implemented in software and partially in hardware.

The inner-loop PD controller, 12, can receive inner-loop setpoints, $r^*(t)$, 24, the controlled variables fed back from the process, $y(t)$, 38, the derivatives, with respect to time, of the controlled variables, $y'(t)$, 40, the measured load variables, $v(t)$, 26, and the derivatives, with respect to time, of the measured load variables, $v'(t)$, 28. The outputs of inner-loop controller 12 are manipulated variables, $u(t)$, 30, and optimum prediction times, $\hat{k}(t)$, 22. The manipulated variables can be transferred to downstream controllers 14 where they may be adjusted producing values 34 which are then transferred to process 16. If the downstream controllers 14 limit any of the manipulated variables 30 (e.g. a fully open or closed valve), a logic signal, 20, indicating this limiting is produced from the downstream controllers and transmitted to a constraint processor 35. Constraint processor 35 responds to the limiting action in a number of ways selected through signal 33. The response to the limiting action is represented by signal 32 which is transmitted to the appropriate outer-loop controller. The process receives the change in the manipulated variable needed to place it at the desired setpoint level, 18, and continues processing receiving measured load variables, 26, and unmeasured disturbances, $d(t)$, 36. At the appropriate measurement rate, the controlled variable is measured and transferred to PD controller 12, and to outerloop controllers 10. The function of these elements is described in more detail below.

The outer-loop integral controller contains n outer-loop controllers, 10, $(C_1 \ldots C_n)$, one for each pair of controlled and manipulated variables. The outer-loop controllers 10 adjust the inner-loop setpoints producing, $r_1^*(t) \ldots r_n^*(t)$, 24. The outerloop controllers can use as inputs the outer-loop setpoints, 18, $r(t)$, and the controlled variables, 38, $y(t)$. Optionally, the optimum prediction times, 22, $\hat{k}(t)$, produced from PD controller 12, can be used to determine the integral time constants for the outer-loop integral controllers. The use of the optimum prediction time is advantageous since it automatically tunes the integral controllers to adapt to the dynamic conditions of the process without requiring manual intervention or adaptive tuning.

The outer-loop controllers can employ pure integral action, PI action, or another type of integral action. For example, the PI action may be expressed mathematically for the i-th PI implementation as follows:

$$r^*_i(t)=x_i(t)+0.2[r_i(t)-y_i(t)] \quad (1)$$

where the integral term is represented by $x_i(t)$. The integral term, $x_i(t)$, may be calculated according to the following mathematical relations:

$$\text{initialize: } x_i(0)=y_i(0). \quad (2)$$

when downstream limiting occurs:

$$x_i(t+1)=x_i(t) \text{ OR } x_i(t)=x_i(t-1). \quad (3)$$

otherwise:

$$x_i(t+1)=x_i(t)+(0.3*\hat{k}_i(t))^{-1} *(r_i^*(t)-x_i(t)). \quad (4)$$

For the case where the outer-loop controllers employ pure integral action only, the outer-loop integral action may be expressed mathematically for the i-th integral implementation as follows:

$$r^*(t)=r^*(t-1)+[(r(t)-y(t))*(1/(2*\hat{k}(t)-1))]. \quad (5)$$

In either case, the outputs from the outer-loop controllers are inner-loop setpoints, 24, $r^*(t)$, which are then transmitted to PD controller 12.

PD controller 12 can receive inner-loop setpoints, 24, $r^*(t)$, as well as the measured load variables, v(t), 26, the derivatives of the measured load variables, v'(t), 28, the controlled variables, y(t), 38, and the derivatives of the controlled variables, y'(t), 40. The feedback of these actual control measurements makes the controller a feedforward proportional-and-derivative controller. PD controller 12 then determines the optimum manipulated variables, u(t), 30 and the optimum prediction times, $\hat{k}(t)$, 22. The optimum prediction times 22 can be either transmitted to the outer-loop controllers 10, or discarded, and the optimum manipulated variables can be either transmitted to downstream controllers or directly to the process.

Further downstream controllers 14 may be utilized in the control system adjusting the manipulated variables as needed. If either the PD controller or the downstream controllers set a manipulated variable at or beyond its threshold amount, a logic signal 20 is generated indicating the limited manipulated variable. Limiting occurs, for example, when a control element such as a valve is fully open and cannot satisfy the demands of the controller. Logic signal 20 is transmitted to constraint processor 35 which initiates a constraint signal 32 indicating a particular constraint action to be employed by outer-loop controllers 10. The particular constraint action that is to be taken can be transmitted to the outer-loop controller of the corresponding limited manipulated variable through constraint signal 32.

Figure 2:
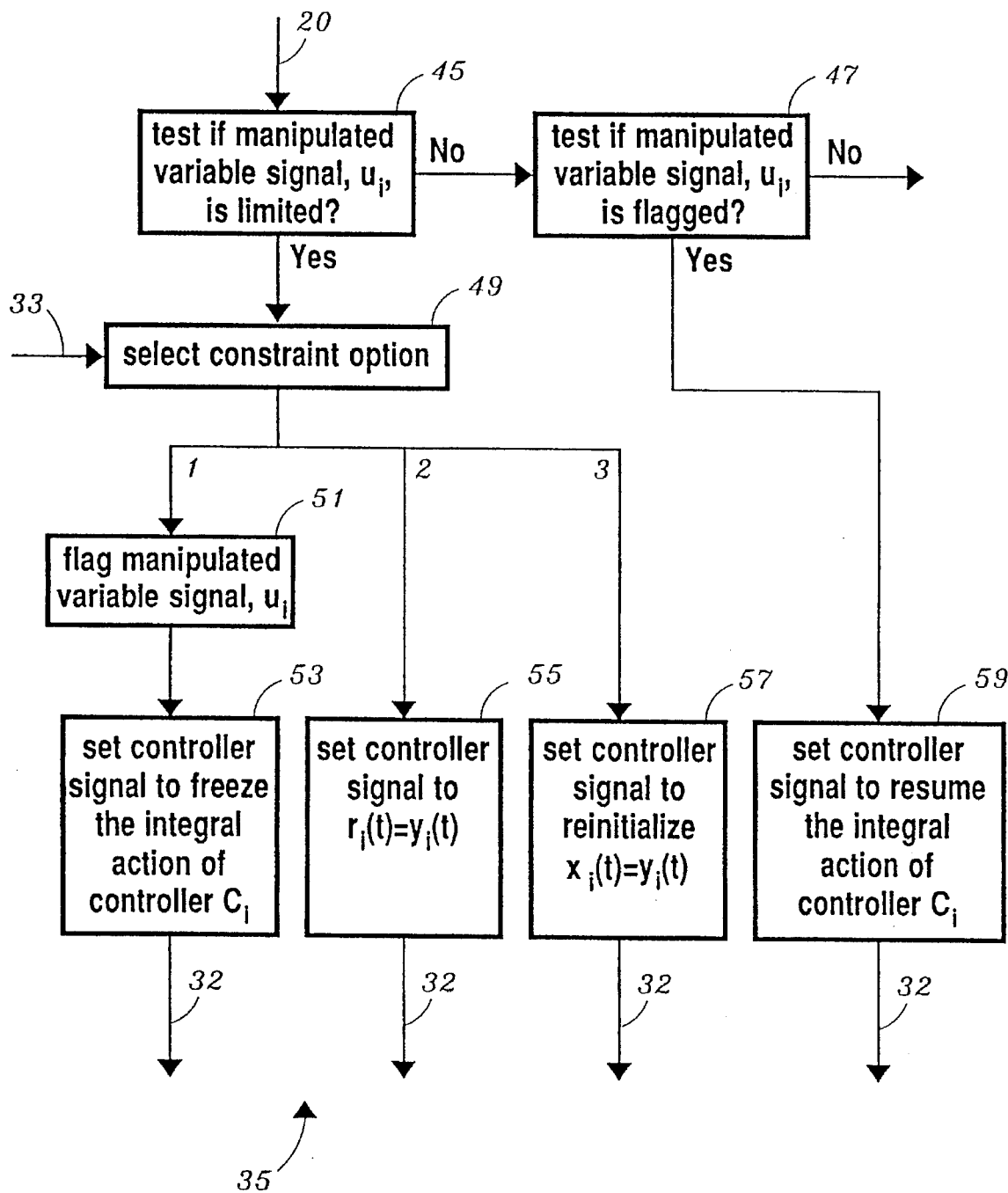
FIG. 2 is a flow chart illustrating the steps in the constraint management scheme as used in the first and second embodiments of the process control system.

FIG. 2 illustrates the steps that can be taken by constraint processor 35. Referring to FIG. 2, in step 45, the logic signal, 20, is tested to determine if the corresponding manipulated variable or a signal in its downstream path is limited (i.e. is at or has exceeded a threshold amount). If the signal indicates limiting, one of three possible constraint management options can be taken. The particular option is chosen through signal 33. The choice of a particular option is dependent on the particular application. In the first option, the associated manipulated variable is flagged in step 51, and in step 53 controller signal 32 can be set to temporarily freeze the integral action of the associated controller. For the second option, controller signal 32 can be used to set the setpoint of the associated controller, r(t), equal to the measurement, y(t), as in step 55. For example, if $u_i(t)$ is at its upper limit, then for outer-loop controller $C_i$, $r_i(t)=y_i(t)$. In the third option, controller signal 32 can be used to reinitialize the associated controller's integral term to the measurement, $x_i(t)=y_i(t)$. For those manipulated variables which were not limited, a further test can be made in step 47 to check if they were previously limited, in which case, controller signal 32 can be set to resume the integral action of the associated controller, in step 59.

Referring again to FIG. 1, each outer-loop controller produces a new inner-loop setpoint for each controlled variable at each time step t of the process, which can be transmitted to PD controller 12. PD controller 12, in turn, recomputes a selected value of the manipulated variable, u(t), 30, for each paired controlled variable at each time step t which represents a change made to the process in order to achieve the inner-loop setpoint. Additional downstream controllers 14 may be employed providing further control action adjusting the manipulated variables producing values 34. Process 16 receives values 34 adjusting its operational parameters accordingly. The process proceeds in a continuous fashion encountering measured loads 26 and unmeasured disturbances 36.

The function of the inner-loop PD controller is to recompute values of the manipulated variables, considering the effect, if any, of the limited control loops on the non-limited control 5 loops, that will place the controlled variables at a level as close as possible to the desired setpoint. The recomputation of the values of the manipulated variables is performed on-line by the inner-loop controller since limiting by the downstream controllers cannot be known in advance. Although, the controller incurs additional overhead for this on-line computation, it achieves more accurate control when limiting occurs.

The objective of the inner-loop controller is to calculate a new value for each manipulated variable such that the difference between its paired controlled variable and setpoint is zero or minimal. This difference is also referred to as the error signal. The calculation of these manipulated variables can be made using the well-known quasi-Newton iterative method. (A more detailed description of the quasi-Newton iterative method can be found in INTRODUCTION TO APPLIED MATHEMATICS by Gilbert Strang, Wellesley-Cambridge Press, 1986.) This method starts out with an initial approximation for each manipulated variable and iteratively improves the approximation until the corresponding error signal is within an acceptable tolerance level. The initial approximation is the value of the manipulated variable computed from the previous operation of the controller. The improved approximation is based on the derivative of the manipulated variable with respect to its paired controlled variable. The paired controlled variable is computed by a neural network trained to determine the controlled variable based on an optimum prediction time and considering the limiting effect of any manipulated variables. The controlled variable computed by the neural network represents the process output at a future time where the least manipulated variable change is required to place the process close to the setpoint. The approximations are iteratively computed considering the effect of each manipulated variable on all others, and converges when the corresponding error signal is minimized.

This process can be performed by the PD controller through two nested iteration loops. The inner-loop iteration computes the effect of each manipulated variable at time step t on all other manipulated variables at time step t. The inner loop is denoted by iteration variable i and iterates for each manipulated variable $u_i(t)$, for i=1 to n. The outer-loop iteration controls the convergence of this process by controlling the number of times the inner loop iterates. The outer loop is denoted by the iteration variable ii and can iterate for either a fixed number of iterations, ii=1 to nn, or until each loop converges, which is defined when $|r^*_i(t)-\hat{y}_i(t)|<\epsilon$, where $\epsilon$ is a user-set tolerance.

Figure 6:
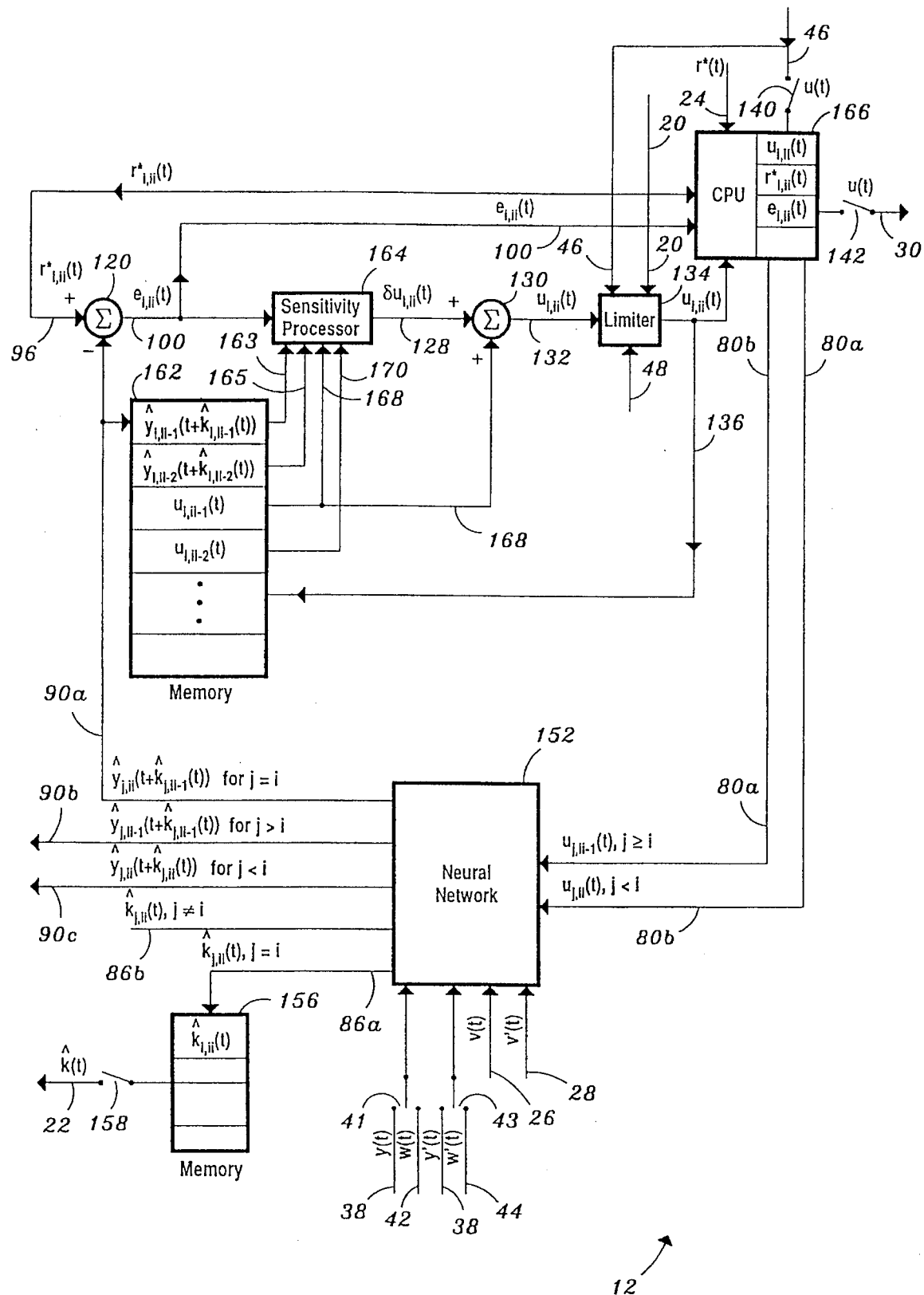
FIG. 6 illustrates the processing elements contained within the PD controller.

FIG. 6 illustrates the internal structure of PD controller 12. FIGS. 7–10 illustrate the steps that can be taken by PD controller 12. The slower loop consists of steps 50-52-54-56-58-60-62 and the faster loop consists of steps 56-58-60-62. The notation used to illustrate the iterative process in FIGS. 7 through 10 is as follows:

ii—denotes the current iterate of the slower loop, where ii=1 to nn, i—denotes the current iterate of the faster loop, where i=1 to n, and j—is an index denoting a particular manipulated variable, controlled variable, or optimum prediction time where 1<=j<=n.

With reference to FIGS. 1 and 6, the PD controller can utilize a vector of n inner-loop setpoints, r*(t), 24; controlled variables, y(t), 38; the derivatives of the controlled variables, y'(t), 40; a vector of m measured load variables, v(t), 26; a vector of m derivatives of the measured load variables, v'(t), 28; and a vector of n manipulated variables. Initially, the manipulated variables can be the back calculated values, 46, from the downstream controllers which can be selected by closing switch 140. Otherwise, they can be the manipulated variables previously computed by the PD controller which are stored in the memory associated with CPU 166. Logic signal, 20, which indicates downstream limiting can also be used as well.

Figure 7:
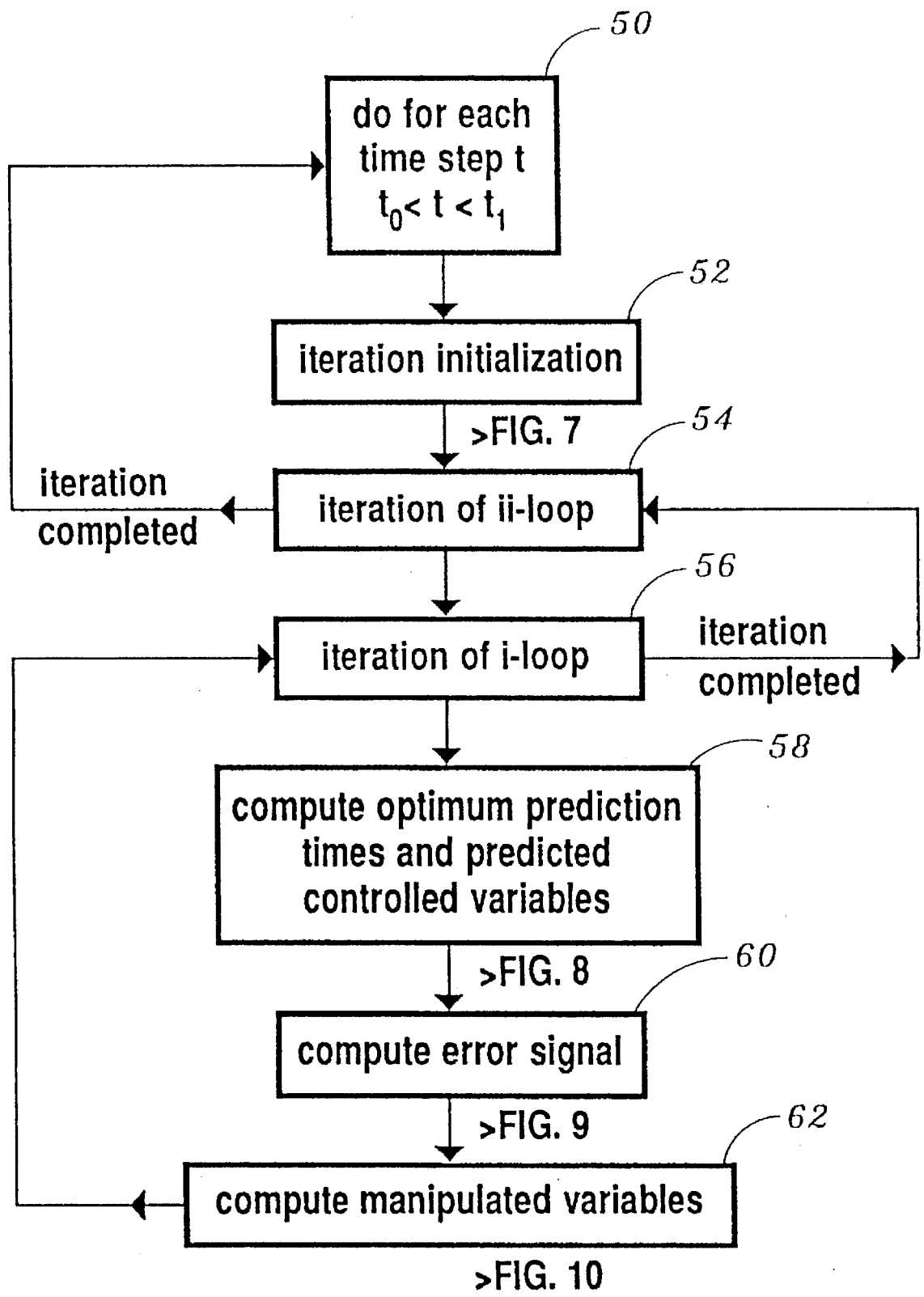
FIG. 7 is a flow chart illustrating the processing steps used by the PD controller in computing the manipulated variables.
Figure 8:
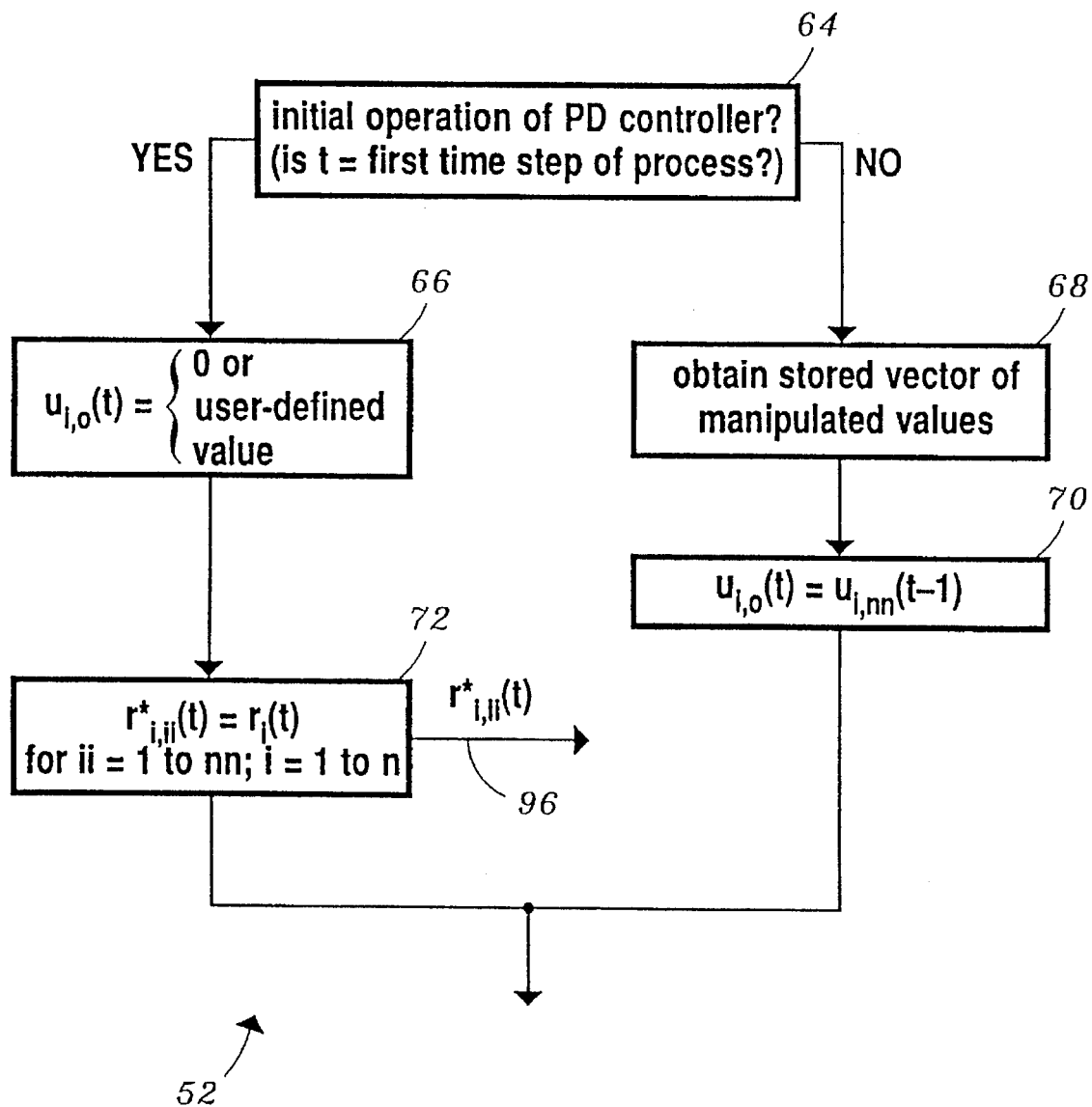
FIG. 8 is a flow chart illustrating the processing steps used in the iteration initialization phase by the PD controller.

The controller can proceed at time step t, step 50 in FIG. 7, with CPU 166 performing iteration initialization, step 52 in FIG. 7. Referring to FIGS. 7 and 8, CPU 166 first determines, step 64 in FIG. 8, whether it is to perform initialization for the first time step of the process, or for any other subsequent iteration. For the first iteration, the manipulated variables can be initialized, step 66 in FIG. 8, in accordance with the following mathematical relation:

$$u_{i,0}(t)=0=\text{or any other user-defined value,} \tag{6}$$

and the inner-loop setpoints are initialized, step 72 in FIG. 8, in accordance with the following mathematical relation:

$$r^*_{i,ii}(t)=r^*_i(t), \text{ for ii=1 to nn, and i=1 to n.} \tag{7}$$

For all subsequent iterations, the manipulated variables are initialized to the value of the last iteration of the preceding time step. The vector of manipulated variables from the last iteration, nn, of the preceding time step, t-1, is obtained from the memory of CPU 166, step 68 of FIG. 8. These manipulated variables can then be set, step 70 of FIG. 8, in accordance with the following mathematical relation:

$$u_{i,0}(t)=u_{i,nn}(t-1). \tag{8}$$

Referring to FIGS. 6 and 7, CPU 166 can execute the slower loop iteration, step 54 of FIG. 7. Initially, the ii-iterate can be set to 1, and otherwise incremented by one. Next, CPU 166 can execute the faster loop whereby the i-iterate index is initially set to 1, and otherwise incremented by one. Neural network 152 then proceeds to compute the optimum prediction times and the predicted controlled variables, step 58 of FIG. 7.

Figure 9:
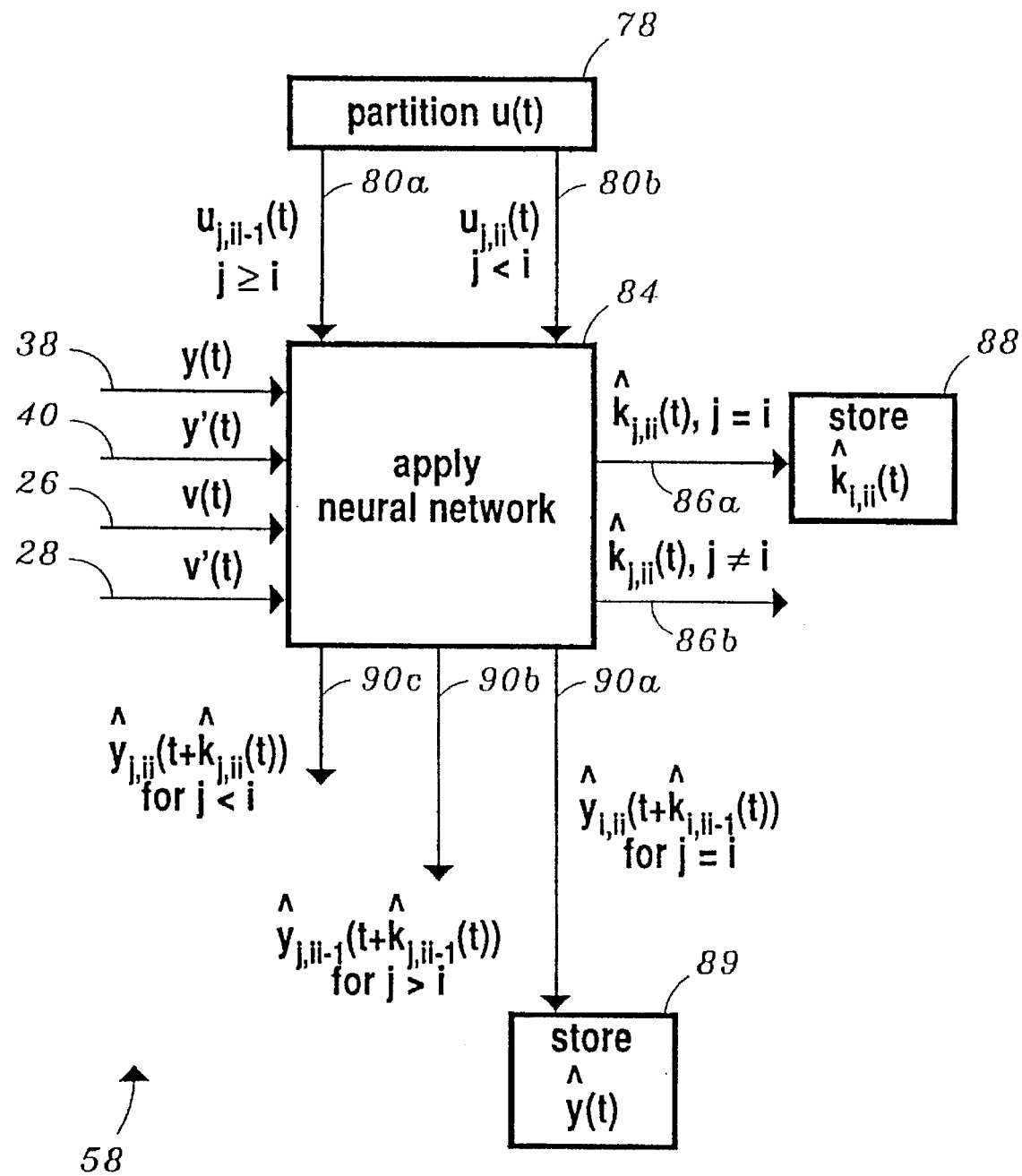
FIG. 9 is a flow chart illustrating the processing steps used in the computation of the optimum prediction times and the predicted controlled variables by the PD controller.

Referring to FIGS. 6 and 9, in order for neural network 152 to compute the optimum prediction times and the predicted controlled variables, CPU 166 transmits a set of values of the manipulated variable signals to neural network 152 which are stored in its memory. The memory associated with CPU 166 can store the current values of the manipulated variables. To initialize at time step 0, the values of the manipulated variables from the downstream controllers are the current values of the manipulated variables stored in the memory of CPU 166. At the start of the first iteration for each time step, t>0, the values of the manipulated variables from the previous operation of the PD controller at time step t-1 are the current values stored in the memory of CPU 166. During the on-going operation of the PD controller, the current values of the manipulated variables are those computed at the present i,ii-th iteration and are stored in the memory of CPU 166. At each operation of the neural network at the i,ii-th iteration, CPU 166 transmits a set of values of the manipulated variables based on the current values stored in its memory. The values of the manipulated variables transmitted to neural network 152 can be as follows:

$$u_{j,ii-1}(t) \text{ for } j>=i, \textbf{80}a, \text{ those manipulated variables which have not been through iteration i,ii and, therefore, use the value of the ii-1 th iteration, and} \tag{9}$$

$$u_{j,ii}(t) \text{ for } j<i, \textbf{80}b, \text{ those manipulated variables which have been through iteration i,ii and, therefore, use the value of the ii-th iteration.} \tag{10}$$

In addition to manipulated variable inputs 80a and 80b, neural network 152 can also receive as inputs a vector of n controlled variables, y(t), 38; a vector of n derivatives of the controlled variables, 40; a vector of m measured-load variables, v(t), 26; and a vector of m derivatives of the measured-load variables, v'(t), 28. Neural network 152 determines the optimum prediction times and the predicted controlled variables thereby generating a vector of n optimum prediction times, $\hat{k}(t)$, and a vector of n predicted controlled variables, $\hat{y}(t)$. The optimum prediction time that corresponds to the i-th manipulated variable, $\hat{k}_{j,ii}(t)$, 86a, where j=i, can be stored in memory 156. The other optimum prediction times, $\hat{k}_{j,ii}(t)$, 86b, where j is not equal to i, are not needed and can be discarded. The paired predicted controlled variable that corresponds to the i,ii-th manipulated variable, $\hat{y}_{j,ii-1}(t+\hat{k}_{j,ii-1}(t))$, 90a, j=i, is transmitted to summation circuit 120 and stored in memory 162. The other predicted controlled variables, $\hat{y}_{j,ii-1}(t+\hat{k}_{j,ii-1}(t))$, for j>i, 90b, and $\hat{y}_{j,ii}(t+\hat{k}_{j,ii}(t))$, for j<i, 90c, are discarded.

Summation circuit 120 computes the error signal $e_{i,ii}(t)$, 100, as the difference between the paired predicted controlled variable and its setpoint in accordance with the following mathematical relation:

$$e_{i,ii}(t)=r^*_{i,ii}(t)-\hat{y}_{i,ii}(t+\hat{k}_{i,ii-1}(t)). \tag{11}$$

The value of the setpoint $r^*_{i,ii}(t)$, 96, is stored in the memory of CPU 166 and is transmitted to summation circuit 120 for the calculation of the error signal. Upon completion of the computation of the error signal for the i,ii-th iteration, $e_{i,ii}(t)$, 100, the value is stored in the memory of CPU 166.

The process proceeds by computing the i,ii-th value of the manipulated variable. This can be accomplished by increasing the previously computed value, $u_{i,ii-1}(t)$, by an increment representing the ratio of a small change to the manipulated variable to a change in the predicted controlled variable. The ratio is computed by sensitivity processor 164 and summation circuit 130.

Sensitivity processor 164 determines the sensitivity of a small change in the manipulated variable to the resulting change in its predicted controlled variable. This sensitivity can be expressed mathematically as the ratio or slope $$g_i = \Delta u_{i,ii}(t)/\Delta \hat{y}_{i,ii}(t+k_i(t)), \text{ where} \quad (12)$$

$\Delta u_{i,ii}(t)$ is any arbitrary input change to $u_{i,ii}$ and
$\Delta \hat{y}_{i,ii}(t+k_i(t))$ is the resultant change to $\hat{y}_{i,ii}(t)$ as a result of $\Delta u_{i,ii}(t)$ and $g_i$ can be approximated as $$g_i = [u_{i,ii-1}(t) - u_{i,ii-2}(t)]/[\hat{y}_{i,ii-1}(t+\hat{k}_{i,ii-1}(t)) - \hat{y}_{i,ii-2}(t+\hat{k}_{i,ii-2}(t))]. \quad (13)$$

Preferably, $g_i$ will be calculated as in equation (12) for at least the first two iterations, and thereafter as in equation (13). Sensitivity processor, 164, computes sensitivity $g_i$ utilizing values of the manipulated variable and its paired optimum predicted controlled variable from the previous two iterations which are stored in memory 162: $u_{i,ii-1}(t)$, 168, $u_{i,ii-2}(t)$, 170, $\hat{y}_{i,ii-1}(t+\hat{k}_{i,ii-1}(t))$, 163, $\hat{y}_{i,ii-2}(t+\hat{k}_{i,ii-2}(t))$, 165, step 106 in FIG. 10. Next sensitivity processor 164 calculates the increment $\delta u_{i,ii}(t)$, 128, by multiplying the error signal $e_{i,ii}(t)$ by the slope $g_i$, as in step 108 of FIG. 10.

Once the increment, $\delta u_{i,ii}(t)$, is calculated the i,ii-th manipulated variable is determined. Summation circuit 130 recomputes the value of the i,ii-th manipulated variable by incrementing the value of the i-th manipulated variable from the previous iteration, $u_{i,ii-1}(t)$ by the increment, $\delta u_{i,ii}(t)$, step 112 in FIG. 10. This is expressed mathematically as $$u_{i,ii}(t) = u_{i,ii-1}(t) + \delta u_{i,ii}(t) \quad (14).$$

Figure 10:
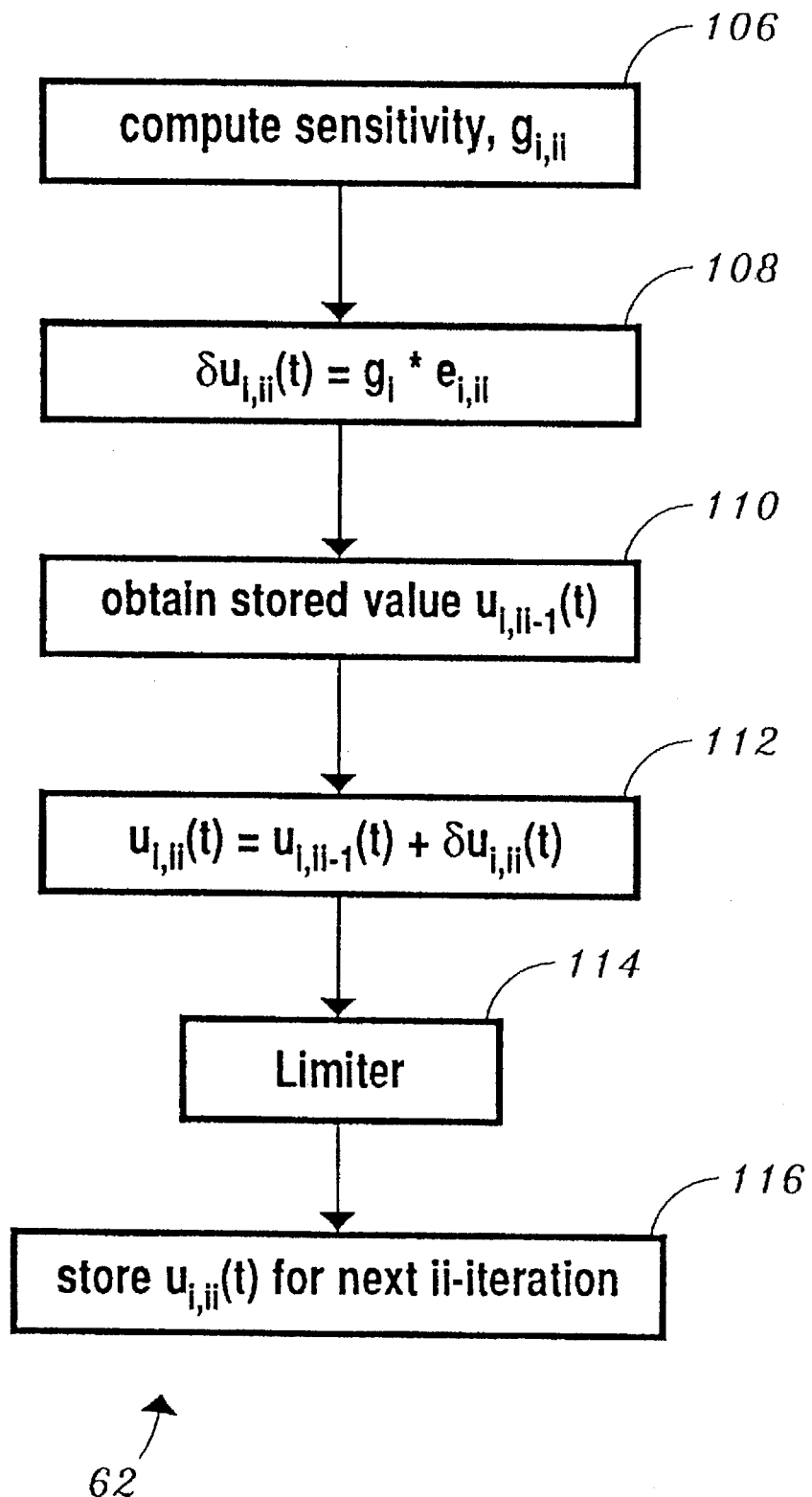
FIG. 10 is a flow chart illustrating the processing steps used in the computation of the manipulated variables by the PD controller.

The i,ii-th value of the manipulated variable, $u_{i,ii-1}(t)$, 168, is obtained from memory 162, step 110 in FIG. 10. The recomputed i,ii-th value of the manipulated variable, $u_i$, is limited by limiter 134, step 114 in FIG. 10, if necessary to prevent the manipulated variable from exceeding its threshold. The final value of the i,ii-th manipulated variable is then stored in memory 162 for use in subsequent iterations, step 116 in FIG. 10.

This process continues for n i-iterations and then proceeds for each ii-th iteration until the convergence criteria is satisfied or the nn-th iteration is completed. Upon the completion of the final nn-th iteration, the recomputed values of the manipulated variables, 30, can be transmitted downstream to other controllers and/or to the process. The values of the manipulated variable are those computed at the last ii-th iteration which can be stored in the memory of CPU 166 and which are transmitted upon closing switch 142. Similarly, the optimum prediction times, $\hat{k}(t)$, 22, can be transmitted to the outer-loop controllers when switch 158 is closed. The values transmitted are those computed at the last ii-th iteration.

Limiter 134 limits the i,ii-th value of the manipulated variable, $u_i(t)$, if necessary, in order to prevent the manipulated variable from exceeding its threshold. The limiter can function in two ways. In the preferred manner, the limiter receives logic signal 20 and back calculated values of the manipulated variables 46 selected by closing switch 140. Logic switch 20 indicates whether a manipulated variable has been limited by the downstream controllers and, if so, whether it has exceeded its upper or lower bound. Then the manipulated variable is set to the back calculated value, 46. Alternatively, the limited manipulated variable can be set to a user-defined value inputted through signal 48.

The operation of the first control embodiment will be described below. Referring to FIG. 1, at selected time intervals controlled variables 38 and measured load variables 26 can be sensed or measured through appropriate instrumentation and transmitted back to PD controller 12 and outer-loop controller 10 simultaneously. Typically, the measured properties of the process may include the flow rate, pressure, temperature, or fluid chemical composition. The derivatives of these signals can be obtained either from measurements through appropriate instrumentation or from computations by a processing element. These derivative signals can be transmitted to PD controller 12. The controller responds quickly to its input signals producing manipulated variables 30 and optimum prediction times 22. Initially, the adjusted setpoint, r*(t), 24, can be set equal to the setpoint, r(t). Manipulated variables 30 are transmitted to downstream controllers 14. Meanwhile, the outer-loop controllers 10 perform the slower integral control action producing adjusted setpoints 24 which can be used by PD controller 12 at the next control interval. Downstream controllers 14 employ further control action producing adjustments to the manipulated variables 30 which can be utilized by the process. If a manipulated or downstream variable is limited, a signal, 20, indicating the limiting action can be transmitted to constraint processor 35. 10 The constraint processor determines the appropriate constraint action and transmits this action through constraint signal 32 to the appropriate outer-loop controller. The entire process is then repeated at the next measurement interval.

Figure 3:
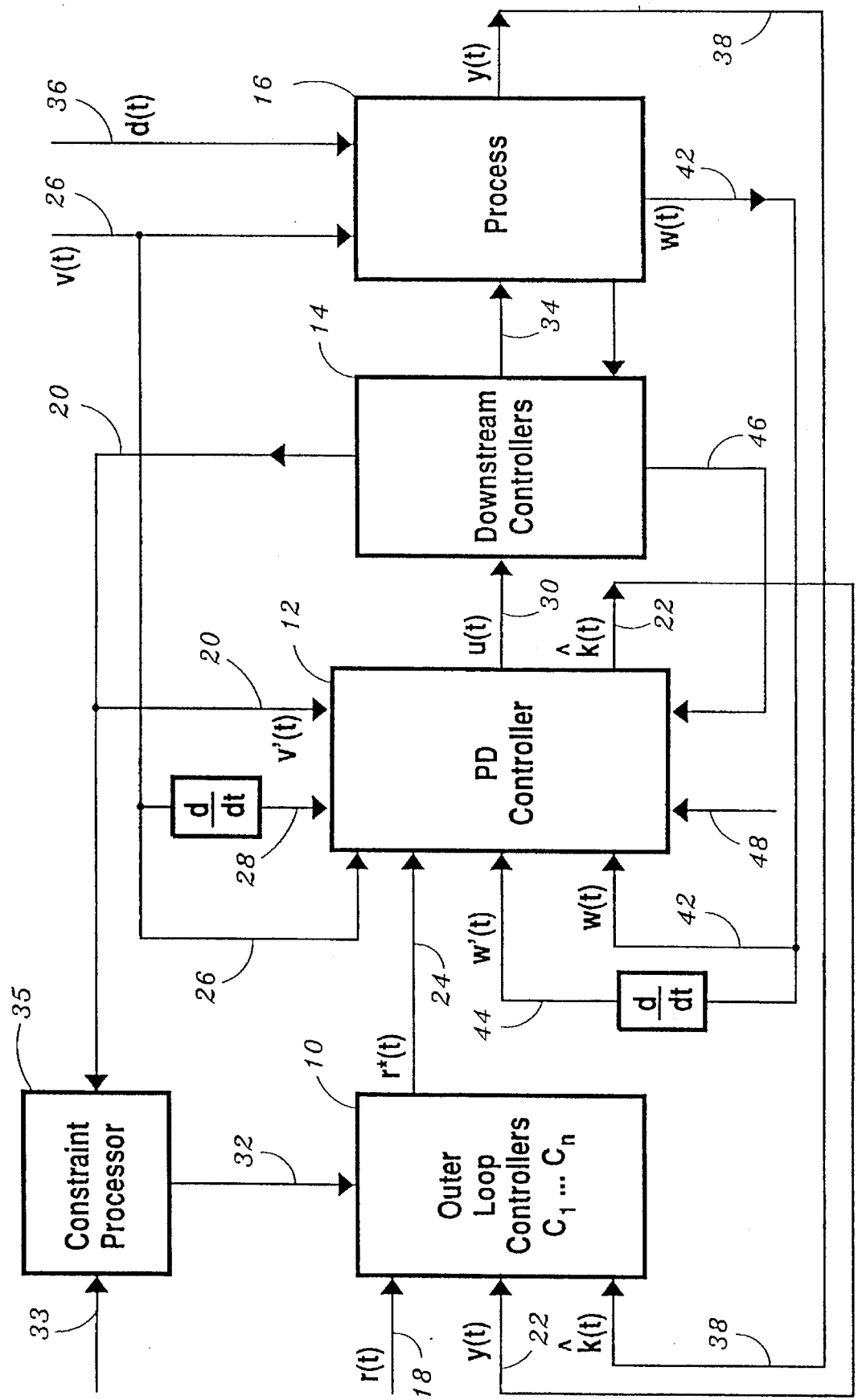
FIG. 3 illustrates the second embodiment of the process control system wherein the inner-loop PD controller receives process feedback through inferential measurements and is cascaded with outer-loop controllers that receive process feedback through the controlled variables.

FIG. 3 illustrates the second process control embodiment. Referring to FIGS. 3 and 6, the physical structure of the second control embodiment is similar to the first embodiment. The process control structure employs a PID controller consisting of outer-loop integral-type controllers, 10, cascaded with a PD controller, 12, cascaded with further controllers 14, downstream from the controller, which are coupled to a process 16. The outer-loop controllers receive process feedback through the controlled variables, y(t), 38, which are measured at selected time intervals.

The difference is in the process measurement that is fed back to inner-loop controller 12. Inner-loop controller 12 receives process feedback through inferential variables, w(t), 42, selected through switch 41, their derivatives, w'(t), 44, selected through switch 43, measured load variables, v(t), 26, and their derivatives, v'(t), 28, which are measured at a shorter time interval than of the controlled variables. Inferential variables are inferred approximations of the value of the controlled variables. They are typically continuous measurements made without detailed analysis. For example, in a distillation column, the controlled variable may be the chemical composition of the mixture and the inferential measurement may be the tray temperature from which the chemical composition may be inferred. The tray temperature is sampled continuously whereas the controlled variable is sampled at infrequent intervals requiring elaborate analysis. The use of the inferential variables by the inner-loop controller causes the process to operate at a faster control rate than the integral controllers, thereby providing a quicker response to changes to the process.

The operation of the second embodiment will be described below. Inferential variables, w(t), 42, are sensed or measured through appropriate instrumentation at a faster sampling rate and transmitted to inner-loop controller 12. The derivatives of the inferential variables, w'(t), 44, can be obtained either from measurements through appropriate instrumentation or from computations by a processing element and are transmitted to inner-loop controller 12. The measured load variables, v(t), 26, and their derivatives, v'(t), 28, are also sampled at the same faster sampling rate and are transmitted to inner-loop controller 12 as well. The inner-loop controller then computes manipulated variables 30 which are transmitted downstream for use in affecting the process, and optimum prediction times 22 are transmitted to outer-loop controllers 10. The inner-loop controller operates continuously in this fashion utilizing the values of the adjusted setpoints r*(t), 24, which were last computed by the outer-loop controllers.

Simultaneously at selected measurement intervals, controlled variables 38 can be sensed or measured through appropriate instrumentation and transmitted back to outer-loop controllers 10. These measurements are made at a slower sampling rate than that of the inferential variables. The outer-loop controllers also use the last values of the optimum prediction times, 22, which were transmitted from the inner-loop controller. The outer-loop controllers perform an integral control action using the optimum prediction times to determine the integral time constants, and produce adjusted setpoints, 24. These adjusted setpoints are then transmitted to the inner-loop controller.

Figure 4:
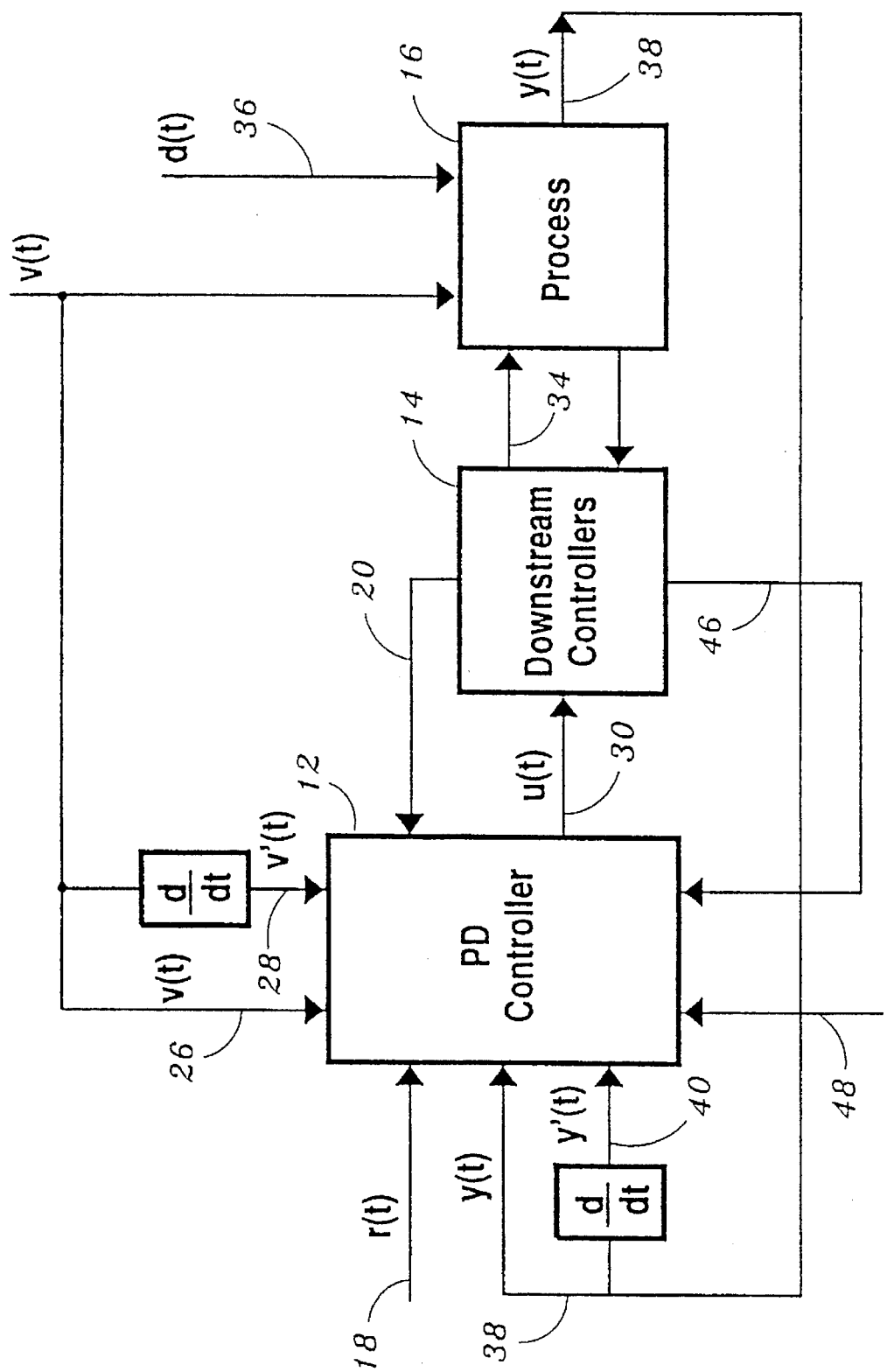
FIG. 4 illustrates the third embodiment of the process control system wherein the process control system consists of the PD controller solely without the outer-loop controllers and wherein the PD controller receives process feedback through the controlled variables.

FIG. 4 illustrates the third process control embodiment which provides only PD control action performed by controller 12. This type of control system is simpler and advantageous for processes that do not need integral control action. Referring to FIG. 4, this control system consists of PD controller 12, cascaded to downstream controllers 14, which are coupled to process 16. PD controller 12 receives measured load variables, v(t), 26, their derivatives, v'(t), 28, the outer-loop setpoints, r(t), 18, controlled variables, 38, and their derivatives, y'(t), 40. PD controller 12 performs a PD control action producing manipulated variables, u(t), 30 and the optimum prediction times, 22. Manipulated variables 30 can then be transmitted to downstream controllers, 14. The downstream controllers, 14, utilize the manipulated variables in their operation producing values, 30, which are used by the process to place it at the desired setpoints. The process proceeds in a continuous manner encountering measured load variables, v(t), 26, and unmeasured disturbances, d(t), 36. At selected time intervals, the controlled variables are measured or sensed through appropriate instrumentation and fed back to PD controller 12. Thus, the process control structure of this embodiment is that of a feedforward proportional-and-derivative controller.

Figure 5:
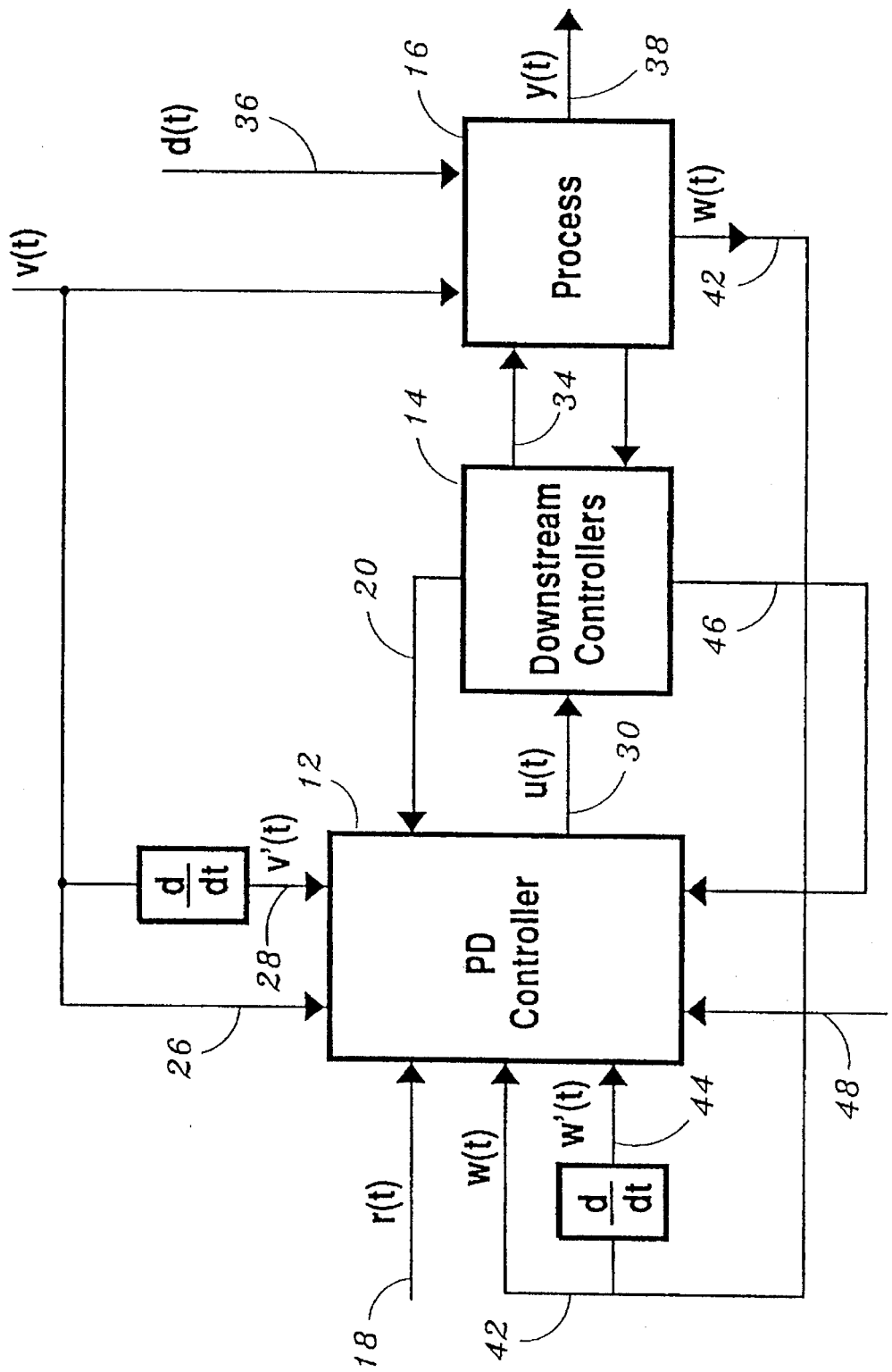
FIG. 5 illustrates the fourth embodiment of the process control system wherein the process control system consists of the PD controller solely without the outer-loop controllers and wherein the PD controller receives process feedback through the inferential variables.

FIG. 5 illustrates the fourth embodiment of the process control system. Referring to FIG. 5, this embodiment has the identical control structure as in the third embodiment. It employs PD controller, 12, used to produce manipulated variables, 30, which can be transmitted to downstream controllers, 14, which therein produce values, 34, which will adjust the process, 16, to place it at the desired setpoints. The difference lies in the process feedback that PD controller 12 receives. The inner-loop PD controller receives feedback through inferential variables, w(t), 42, their derivatives, w'(t), 44, measured load variables, v(t), 26, and their derivatives, v'(t), 28, which are sensed or measured through appropriate instrumentation at a shorter interval than that of the controlled variables. This faster feedback gives the controller in this embodiment the ability to respond quickly to process changes.

The operation of the fourth embodiment will be described below. Inferential variables, w(t), 42, are sensed or measured through appropriate instrumentation at a faster sampling rate and transmitted to inner-loop controller 12. The derivatives of the inferential variables, w'(t), 44, can be obtained either from measurements through appropriate instrumentation or from computations by a processing element and are transmitted to inner-loop controller, 12. The measured load variables, v(t), 26, and their derivatives, v'(t), 28, are also sampled at the same faster sampling rate and are transmitted to inner-loop controller 12 as well. The inner-loop controller then computes manipulated variables, 30, which are transmitted downstream for use in affecting the process. The inner-loop controller operates continuously in this fashion utilizing the values of the setpoint r(t), 18.

This disclosure presents a robust process control system utilizing neural-network-based PD controller for controlling multivariable, nonlinear, dynamic processes.

The preferred embodiments of this process control system have several advantages. First, they are effective at handling unmeasured load disturbances which makes them robust accommodating pure dead-time processes as well as non-self-regulating processes. This is because there is direct proportional and derivative feedback to the controller from the process. Furthermore, actual control measurements are fed back to the PD controller instead of predicted values. This makes the overall process control system more effective at compensating to prevent upsets and combating unmeasured disturbances with feedback gain.

Second, the inner-loop controller receives independent inputs for the proportional terms, namely, the controlled variables or inferential variables, the inner-loop setpoints, and the measured load variables, and independent inputs for the derivative terms, namely, the derivatives of the controlled and measured load variables. These inputs give the controller, in essence, different proportional and derivative gains for each of these terms, thereby making the controller able to respond quickly and accurately to both changes in the setpoint and measured load disturbances without overshooting the response.

Additionally, the use of the inferential variables gives the inner-loop controller the capability of quickly responding to process changes. Control based on the prediction time that requires the smallest change of the manipulated variable assures that the process will not oscillate or overshoot but rather exhibit stable control. The use of the optimum prediction time in determining the time constant used by the outer-loop controllers is advantageous since it automatically tunes the integral controllers to adapt to the process's dynamic conditions without requiring manual intervention or adaptive tuning. Furthermore, this control system incurs an overhead for the on-line iterative calculation yet provides more accurate control of the non-limited control loops when limiting occurs.

The various embodiments of this process control system are flexible permitting variations from the preferred embodiment in order to suit various types of processes. For example, for some processes, the derivative action may not be warranted. In such cases, the derivatives of the controlled variables and the measured load variables may be eliminated. This may be desirable for a dominant dead-time process or a process with large measurement noise.

It should be further noted that in all of the aforementioned embodiment, the function of the neural network need not be performed by a neural network. The function of the neural network can be embodied in other types of data processing structures. Examples of such structures are, but not limited to, nonlinear function generator or characterizer, fuzzy logic process, look-up table, inferential logic machine, or by a processor utilizing a set of equations which would calculate the appropriate values for the signals generated.

Although the preferred embodiments of the invention have been described hereinabove in detail, it is desired to emphasize that this is for the purpose of illustrating the invention and thereby to enable those skilled in this art to adapt the invention to various different applications requiring modifications to the apparatus described hereinabove; thus, the specific details of the disclosures herein are not intended to be necessary limitations on the scope of the present invention other than as required by the prior art pertinent to this invention.

We claim:

1. A method for controlling a process having process inputs, process outputs comprising of at least one controlled variable, and an actuator affecting the process, the method comprising computing at least one manipulated variable for use by the actuator to affect the controlled variable in relation to a setpoint, the method comprising the steps of:

a) obtaining a set of manipulated variables;

b) selecting a first manipulated variable from the set of manipulated variables that has not been previously selected;

c) computing a predicted controlled variable having an associated setpoint and corresponding to said first manipulated variable as a function of the process inputs and outputs, said predicted controlled variable representing the process output as advanced by an optimum prediction time, said optimum prediction time representing the effective response time of the controlled variable to the setpoint;

d) determining sensitivity from a change in value of the predicted controlled variable to a change in value of the corresponding first manipulated variable;

e) determining a difference between the predicted controlled variable and the associated setpoint;

f) incrementing the value of the first manipulated variable in relation to the sensitivity and the difference;

g) repeating steps b) through f) for each manipulated variable from the set of manipulated variables; and h) repeating steps b) through g) until a predetermined condition is satisfied, said predetermined condition being the determination of the optimum prediction time wherein a minimal change in the manipulated variable is required to affect a change in the controlled variable that minimizes the difference between the controlled variable and the associated setpoint so that the difference is within a predetermined tolerance .

2. A method as in claim 1 wherein the step of incrementing the value of the first manipulated variable further comprises modifying the value by utilizing a partial derivative of the first manipulated variable with respect to the corresponding predicted controlled variable.

3. A method as in claim 1 wherein the function defined in the step of computing a predicted controlled variable comprises the process inputs comprising the set of manipulated variables, and the process outputs comprising the controlled variables.

4. A method as in claim 3 wherein the function defined in the step of computing a predicted controlled variable further comprises the process outputs comprising derivatives, with respect to time, of the controlled variables.

5. A method as in claim 3 wherein the function defined in the step of computing a predicted controlled variable further comprises the process inputs comprising measured load variables representing measured load disturbances.

6. A method as in claim 5 wherein the function defined in the step of computing a predicted controlled variable further comprises the process inputs comprising derivatives, with respect to time, of the measured load variables.

7. A method as in claim 1 wherein the function defined in the step of computing a predicted controlled variable comprises the process inputs comprising a set of inferential variables.

8. A method as in claim 7 wherein the function defined in the step of computing a predicted controlled variable comprises the process outputs comprising the controlled variables.

9. A method as in claim 8 wherein the function defined in the step of computing a predicted controlled variable further includes the process outputs comprising derivatives, with respect to time, of the controlled variables.

10. A method as in claim 7 wherein the function defined in the step of computing a predicted controlled variable further includes the process inputs comprising the measured load variables representing measured load disturbances.

11. A method as in claim 10 wherein the function defined in the step of computing a predicted controlled variable further includes the process inputs comprising derivatives, with respect to time, of the measured load variables.

12. A method as in claim 1 wherein said step of computing a predicted controlled variable is performed by a nonlinear function generator previously trained to determine the optimum prediction time and said predicted controlled variable on historical values of the process inputs and outputs.

13. A method as in claim 12 wherein said nonlinear function generator is selected from a neural network, fuzzy logic processor, or inferential logic machine.

14. A method as in claim 1 wherein the step of incrementing the value of the first manipulated variable further comprises the step of limiting the first manipulated variable thereby preventing the value from exceeding its limits.

15. A method as in claim 1 wherein said predetermined condition is when the difference between the setpoint and the predicted controlled variable for each manipulated variable is within a predetermined tolerance.

16. A method as in claim 1 wherein said predetermined condition is achieved within a finite number of iterations.

17. A method as in claim 1 wherein said step of computing a predicted controlled variable further comprises generating the optimum prediction time for further control processing.

18. A system for controlling a process, said process responsive to a set of manipulated variables for affecting the process as a function of a controlled variable in order to place the process at a desired setpoint, said system comprising:

a) means for retrieving a set of current values of the manipulated variables;

b) selector means for choosing a selected manipulated variable from the set of current values of the manipulated variables that has not been previously selected;

c) a nonlinear function generator for generating a predicted controlled variable as advanced by an optimum prediction time, the optimum prediction time representing the effective response time of the controlled variable to the setpoint;

d) a sensitivity processor for determining the sensitivity of a change in value of the predicted controlled variable to a change in the corresponding manipulated variable;

e) a first computation means for determining the difference between the predicted controlled variable and the setpoint corresponding to the selected manipulated variable;

f) a second computation means for recomputing the value of the selected manipulated variable as a function of said difference, said sensitivity, and said current value;

g) a limiter for preventing the selected manipulated variable from exceeding its limits; and h) a processing element for operating said system for all values of the manipulated variable and for completing the operation of said system when a predetermined condition is satisfied.

19. A system as in claim 18 wherein said nonlinear function generator is selected from a neural network, fuzzy logic processor, or inferential logic machine.

20. A system as in claim 18 wherein said nonlinear function generator operates with inputs comprising current values of the manipulated variables and controlled variables representing a measured process output.

21. A system as in claim 20 wherein said nonlinear function generator operates with inputs further comprising derivatives, with respect to time, of the controlled variables.

22. A system as in claim 20 wherein said nonlinear function generator operates with inputs further comprising measured load variables representing measured load disturbances.

23. A system as in claim 22 wherein said nonlinear function generator operates with inputs further comprising derivatives, with respect to time, of the measured load variables.

24. A system as in claim 18 wherein said nonlinear function generator operates with inputs comprising the current values of the manipulated variables and inferential variables representing an indication of the controlled variables.

25. A system as in claim 24 wherein said nonlinear function generator operates with inputs further comprising derivatives, with respect to time, of the inferential variables.

26. A system as in claim 24 wherein said nonlinear function generator operates with inputs further comprising measured load variables representing measured load disturbances.

27. A system as in claim 26 wherein said nonlinear function generator operates with inputs further comprising derivatives, with respect to time, of the measured load variables.

28. A system as in claim 18 wherein said nonlinear function generator generates the optimum prediction time for use in further control processing.

29. A system as in claim 18 wherein said nonlinear function generator was previously trained to compute the predicted controlled variable as advanced by the optimum prediction time on historical values of process inputs and process outputs.

30. A system as in claim 18 wherein said predetermined condition is when the difference between the setpoint and the predicted controlled variable for each manipulated variable is within a predetermined tolerance.

31. A system as in claim 18 wherein said predetermined condition is a finite number of iterations.

* * * * *